J. A. WATSON.
HAY FORK.
APPLICATION FILED SEPT. 9, 1910.
1,003,833.
Patented Sept. 19, 1911.
2 SHEETS—SHEET 1.
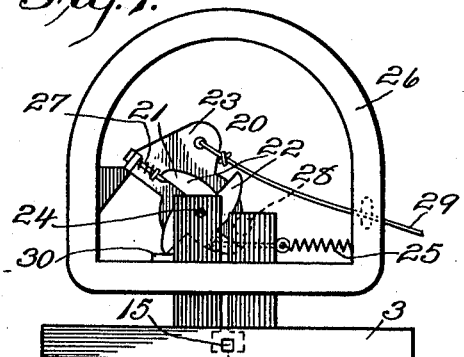
Fig. 1.
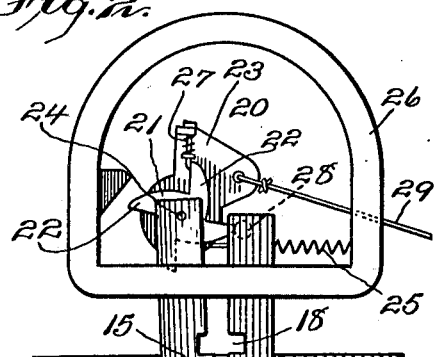
Fig. 2.
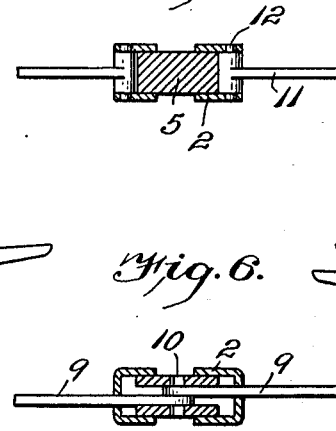
Fig. 5.
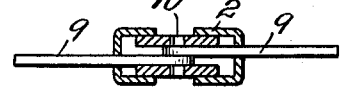
Fig. 6.
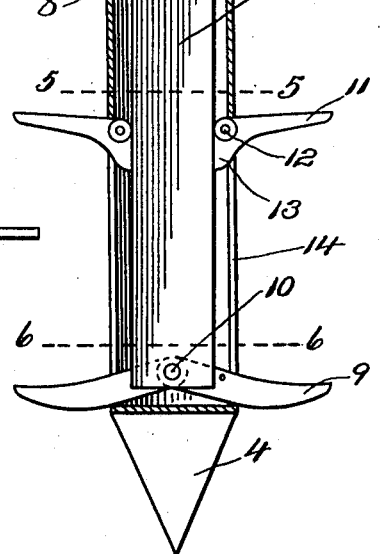
Witnesses
T. P. Britt
E. C. Duffy
Inventor
John A. Watson
By
Attorneys.
COLUMBIA PLANOGRAPH CO., WASHINGTON, D. C.

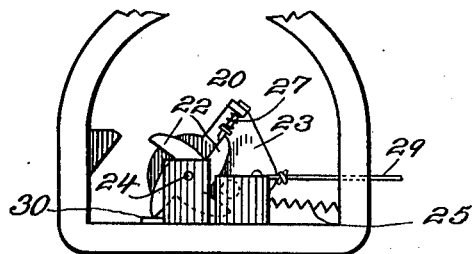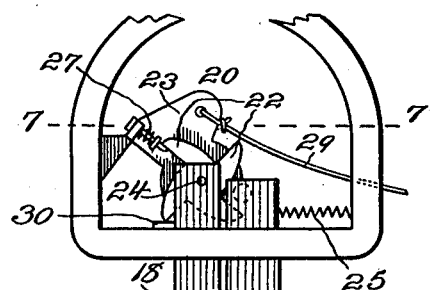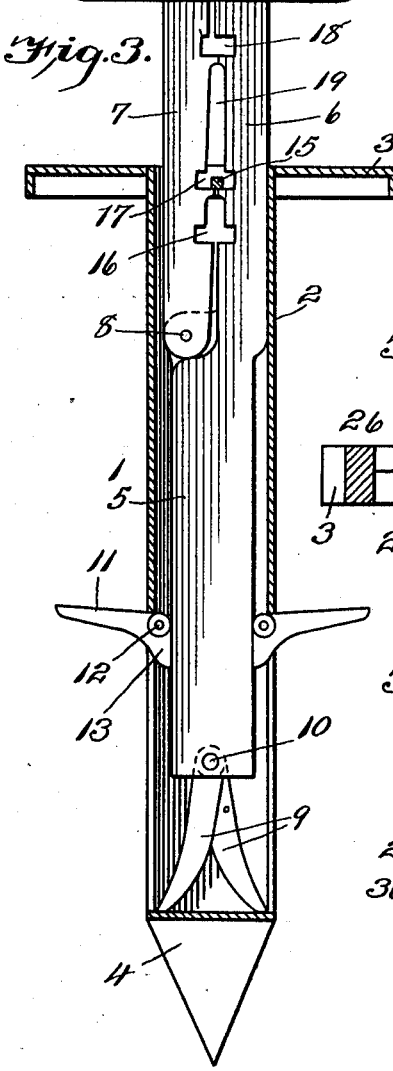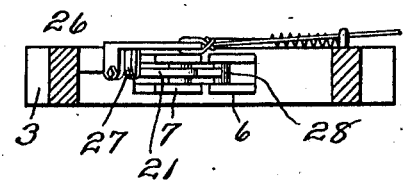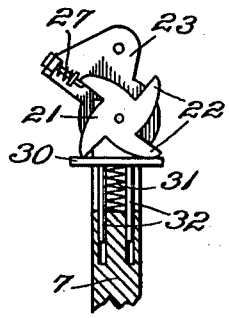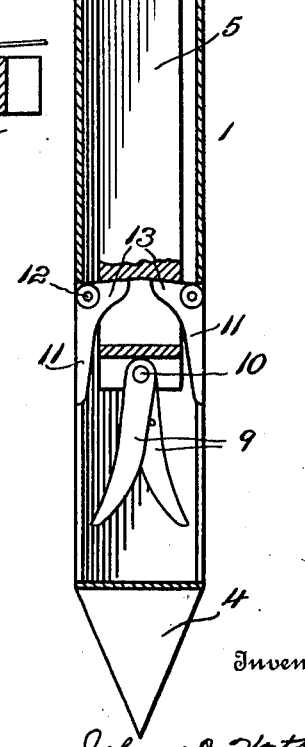

UNITED STATES PATENT OFFICE.

JOHN A. WATSON, OF RAYMOND, ILLINOIS.

HAY-FORK.

1,003,833.  Specification of Letters Patent.  Patented Sept. 19, 1911.

Application filed September 9, 1910. Serial No. 581,319.

*To all whom it may concern:*

Be it known that I, JOHN A. WATSON, a citizen of the United States, residing at Raymond, in the county of Montgomery and State of Illinois, have invented certain new and useful Improvements in Hay-Forks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to hay forks and has for its object to provide a device of this kind having two sets of tines so constructed and arranged that one or both sets can be extended to operate in the hay or like material.

A further object of this invention is to provide a novel means for bringing the tines into operative position.

A further object of this invention is to provide a novel hay fork which is particularly simple in construction, cheap and easy to manufacture, strong, durable and efficient.

With these objects in view the invention consists in the novel construction of the fork and particularly in the novel means employed for bringing the two sets of tines into and out of operative position.

The invention further consists in the novel construction for operating the means controlling the movement of the tines.

The invention further consists in certain other novel details of construction and in combinations of parts all of which will be first fully described and afterward specifically pointed out in the appended claims.

Referring to the accompanying drawings: Figure 1 is an elevation of a hay fork constructed in accordance with my invention. Fig. 2 is a vertical sectional view through the fork. Fig. 3 is a vertical sectional view illustrating the device with one set of tines folded and the other set in operative position. Fig. 4 is a similar view showing both sets of tines in a folded position. Fig. 5 is a horizontal sectional view taken on line 5—5 of Fig. 2. Fig. 6 is a horizontal sectional view taken on line 6—6 of Fig. 2. Fig. 7 is a horizontal sectional view taken on line 7—7 of Fig. 4, and Fig. 8 is a detail elevation of the operating mechanism for controlling the positions of the tines.

Like numerals of reference indicate the same parts throughout the several figures in which;

1 indicates the device which comprises the shell or casing 2, said shell or casing 2 being provided at its top with an annular guard or stop 3 which limits the extent of entrance of the fork into the hay or like material. As will appear from the drawings the bottom end of the shell or casing 2 is pointed at 4 to facilitate the entrance of the fork into the hay or like material.

5 indicates the movable core which comprises two sections 6 and 7 the section 7 being pivoted at 8 to the section 6 as clearly shown in Fig. 2. The section 6 of the core 5 carries the lower pair of tines 9, said lower pair of tines 9 being pivoted together and to the lower end of the core 5 at the point 10, said construction being more clearly shown in Fig. 6.

As will appear from Figs. 2 and 5 the upper pair of tines 11 are pivoted at 12 to the shell or casing 2, said tines 11 being each provided with an arm 13 which is directly in the path of movement of the core 5 as will appear from Fig. 2. The shell or casing 2 is provided with a slot 14 on opposite sides thereof which extends from a point just above the upper pair of tines 11 to the bottom end of the shell or casing 2 through which slots both pairs of tines 9 and 11 operate as clearly shown in the drawings.

As will appear from Figs. 2, 3 and 4 the shell or casing 2 is provided at the upper end thereof with a transverse pin or bolt 15, said transverse pin or bolt 15 being preferably square in cross section as shown in the drawings, and it will also appear that the sections 6 and 7 of the core 5 are provided with three series of registering notches 16, 17 and 18, an opening or slot 19 being provided between the contiguous faces of the sections 6 and 7 in such manner that the said sections 6 and 7 can operate longitudinally within the shell or casing 2 in a manner which will be presently described.

Referring now to the operating mechanism 20 it will be seen that the same comprises a small ratchet wheel 21 having preferably four teeth 22, said wheel 21 being carried on a plate 23 which plate 23 and ratchet wheel 21 are pivoted at 24 to the upper end of the section 7 of the core 5 and as will appear from the drawings a coil spring 25 connected at one end to the loop 26 of the fork and at its other end to the pivoted plate 23 maintains said plate 23 in its normal position shown in Figs. 1 and 4, and as will appear from the drawings a spring actuated pawl 27 is carried on the pivoted plate 23 and arranged in the path of the ratchet wheel 21 in such manner as to engage and hold the ratchet wheel against rotation in one direction which direction is contrary to that of the hands of a watch, although as will be clearly apparent the ratchet wheel is free to rotate in the opposite direction or in the direction of rotation of the hands of a watch.

Carried on the section 6 of the core 5 and in the path of rotation of the teeth 22 of the ratchet wheel 21 is a lug or pin 28 shown in dotted lines in Figs. 1, 2, 3 and 4 the operating line 29 is provided and connected to the pivoted plate 23 for the purpose of operating the device. Carried also on the pivoted section 7 of the core 5 is a vertically movable plate or stop 30 (Fig. 8) commanded by a coil spring 31 and guided on two pins or rods 32, said plate or stop 30 being normally in engagement with two of the teeth 22 of the ratchet wheel 21 in order to stop but not lock the said ratchet wheel against rotation in the direction of rotation of the hands of a watch.

Having thus described the several parts of this invention its operation is as follows: The device being folded or rather the two pairs of tines 9 and 11 being in a folded position as shown in Fig. 4 the fork is thrust into hay, when the upper pair of tines 11 can be opened into operative position in the following manner: The operating line 29 is pulled to throw the pivoted plate 23 into position shown in Fig. 2. This movement of the pivoted plate 23 rotates the ratchet wheel 21 causing one of its teeth 22 to engage and act upon the pin or stop 28 on the section 6 of the core 5, and by reason of the inclined or curved form of the teeth 22 of the ratchet wheel 21 the pivoted section 7 of the core 5 is separated from the section 6 of the core 5 and swung on its pivot 8 in such manner as to cause the entire core 5 to drop by its own weight into position shown in Fig. 3. Within the shell or casing 2 and as the teeth 22 of the ratchet wheel 21 are released from the pin 28 on the section 6 the coil spring 25 draws the pivoted section 7 back into its normal position and causes the two sections 6 and 7 to come together so that the transverse pin or bolt 15 will lie within the registering notches 17 in the contiguous faces of the sections 6 and 7. This movement of the core 5 within the casing 2 in a longitudinal direction causes the core 5 to engage the arms 13 of the upper pair of tines 11 and open said tines into position shown in Fig. 3. When it is desired to bring the lower set of tines into operative position the operating cord 29 is again pulled which causes the ratchet wheel 21 to act on the pin or stop 28 on the section 6 of the core 5 which again swings the section 7 on its pivot 8 allowing the entire core 5 to drop down into position shown in Fig. 1 and as the pin or stop 28 is released by the ratchet wheel 21 the transverse pin or bolt 15 is maintained within the registering notches 18 in the contiguous faces of the sections 6 and 7 of the core 5, thus maintaining both sets or pairs of tines in operative position for action on the hay or like material, and as the ratchet wheel 21 is locked against rotation in one direction by the spring actuated pawl 27 and yieldingly held against rotation in the opposite direction by the plate or stop 30 said wheel cannot be brought into engagement with the pin or stop 28 unless carried into engagement therewith by the operating line 29.

Having thus fully described this invention what I claim as new and desire to secure by Letters Patent of the United States, is:—

1. A device of the character described comprising a shell or casing, a longitudinally movable core within said shell or casing including a pivoted and resiliently engaged member, a pair of tines pivoted within said shell or casing and arranged to fold therein a pair of tines pivoted to said core, and means for operating said core to open one or both sets of said pivoted tines including a rotary toothed member carried upon said pivoted member, said core having an adjunctive member engaged by the teeth of said rotary toothed member.

2. A device of the character described, embracing a shell or casing, a longitudinally movable core arranged within said shell or casing and having a pivoted resiliently engaged member, said core and pivoted member having complemental notches in opposite surfaces thereof, a stop member received by any two opposed complemental notches, a rotary toothed member carried by said pivoted member, an additional pivoted member carried by the aforesaid pivoted member, means carried by said additional pivoted member for engaging a tooth of said rotary member, said core having an adjunctive member engaged by the teeth of said rotary member, means for actuating said rotary member, and tines pivoted within said casing or shell and adapted to be actuated by said core as in extending the tines beyond said shell or casing.

3. A device of the character described, embracing a shell or casing, a longitudinally movable core arranged within said shell or casing and having a pivoted resiliently engaged member, said core and pivoted member having complemental notches in opposite surfaces thereof, a stop member engaging any two opposed complemental notches, a toothed wheel and a pivoted pawl carrying plate carried by said pivoted member, means for actuating said pawl carrying plate, a resiliently engaged stop carried at the upper end of said pivoted member, said stop having frictional engagement with the teeth of said wheel, said core carrying a lateral projection near its upper end adapted to be engaged by the teeth of said wheel, the pawl carried by said plate engaging the teeth of said wheel, tines pivoted within said shell and pivoted tines carried by said core, the first referred to tines adapted to be engaged and extended beyond said shell or casing by said core, the core carried tines also being adapted to be extended beyond said shell or casing.

In testimony whereof, I affix my signature, in presence of two witnesses.

JOHN A. WATSON.

Witnesses:
J. E. McDavid,
J. C. Terry.

Copies of this patent may be obtained for five cents each, by addressing the "Commissioner of Patents, Washington, D. C."